(12) United States Patent
Bouillet et al.

(10) Patent No.: US 10,168,172 B2
(45) Date of Patent: Jan. 1, 2019

(54) NETWORK MAP RECONSTRUCTION FROM MESSAGE DATA

(71) Applicant: INTERNATIONAL BUSINESS MACHINES CORPORATION, Armonk, NY (US)

(72) Inventors: Eric P. Bouillet, Englewood, NJ (US); Bei Chen, Dublin (IE); Randall L. Cogill, Dublin (IE); Thanh L. Hoang, Kildare (IE); Marco Laumanns, Zurich (CH); Rahul Nair, Dublin (IE); Tim Nonner, Zurich (CH); Pascal Pompey, Nanterre (FR); John Sheehan, Dublin (IE); Jacint Szabo, Adliswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 86 days.

(21) Appl. No.: 15/334,795

(22) Filed: Oct. 26, 2016

(65) Prior Publication Data

US 2018/0112991 A1    Apr. 26, 2018

(51) Int. Cl.
*G01C 21/34* (2006.01)
*G01C 21/36* (2006.01)
*B61L 25/02* (2006.01)
*B61L 27/00* (2006.01)

(52) U.S. Cl.
CPC .......... *G01C 21/3492* (2013.01); *B61L 25/02* (2013.01); *B61L 27/0077* (2013.01); *G01C 21/343* (2013.01); *G01C 21/3691* (2013.01)

(58) Field of Classification Search
CPC ............ G01C 21/3492; G01C 21/3691; G01C 21/343
USPC ........................................................ 701/422
See application file for complete search history.

(56) References Cited

U.S. PATENT DOCUMENTS

2007/0067126 A1    3/2007  Adachi
2009/0138188 A1*   5/2009  Kores .................... G01C 21/32
                                               701/117

FOREIGN PATENT DOCUMENTS

CN             101520331 A       9/2009

* cited by examiner

*Primary Examiner* — Brian P Sweeney
(74) *Attorney, Agent, or Firm* — Griffiths & Seaton PLLC

(57) ABSTRACT

Embodiments for network reconstruction from message data by a processor. A digital map may be created using one or more messages of a plurality of vehicles obtained at a plurality of control points of a route network. The digital map may be analyzed to estimate a feasibility of simultaneous trajectories of the plurality of vehicles between selected locations in the route network.

16 Claims, 8 Drawing Sheets

NETWORK MAP RECONSTRUCTION FROM MESSAGE DATA

BACKGROUND OF THE INVENTION

Field of the Invention

The present invention relates in general to computing systems, and more particularly to, various embodiments for network reconstruction from message data by a processor.

Description of the Related Art

In today's interconnected and complex society, computers and computer-driven equipment are more commonplace. Processing devices, with the advent and further miniaturization of integrated circuits, have made it possible to be integrated into a wide variety of personal, business, health, home, education, and other devices. Accordingly, the use of computers, network appliances, and similar data processing devices continue to proliferate throughout society, particularly in the transportation environment.

SUMMARY OF THE INVENTION

Various embodiments for network reconstruction from message data by a processor, are provided. In one embodiment, by way of example only, a method for network reconstruction from message data, again by a processor, is provided. A digital map may be created using one or more messages of a plurality of vehicles (e.g., trains) obtained at a plurality of control points of a route network. The digital map may be analyzed to estimate a feasibility of simultaneous trajectories of the plurality of vehicles between selected locations in the route network.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
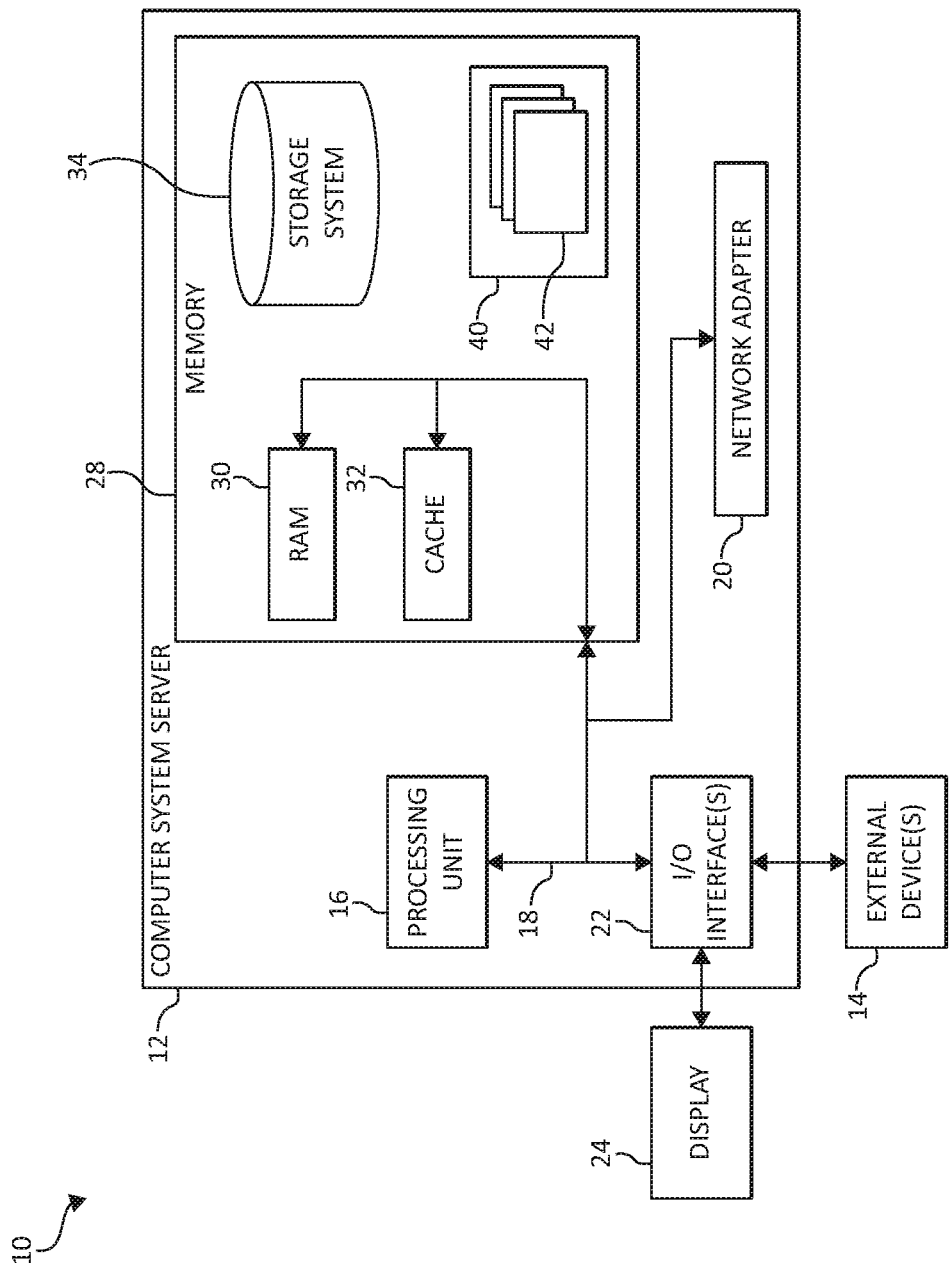
FIG. 1 is a block diagram depicting an exemplary computing node according to an embodiment of the present invention.

Rapid growth in various municipalities, cities, and other communities result in increased build-up and utilization of the infrastructures such as, for example, roads, bridges, airports, and railroads. The complexity of these infrastructures often times create challenges for operators of vehicles, such as, for example, buses, aircrafts, trains and/or other like transit machines, to safely navigate through these complex environments. Adding to these challenges, information technology (IT) systems supporting the operations of the various transit modes (e.g., bus, rail, and/or aircraft) may generate and store time stamped messages containing the location and status of vehicles during operations. Digital maps of the networks served by the transit operator may change over time as infrastructure changes. Maps may be owned and maintained by organizations other than those who wish to utilize them. Maps may not be annotated with statistics generated from recent operations. The present invention provides a method for construction of digital maps from message data that may be used for inferring likely movements of vehicles through the network (e.g., railway system) and assessing the feasibility of simultaneous trajectories of multiple vehicles in the network.

In one aspect, the present invention provides for inferring segments in a vehicle specific digital map (e.g., a rail-specific digital map) from sequential vehicle (train) messages. Both feasible and infeasible simultaneous vehicle (train) movements at one or more locations may be identified in the network. Digital maps, which may be partially and/or constructed from one or more physical maps and/or one or more control points, may be used to estimate a probability of one or more paths of vehicles (e.g., trains) that may be between given locations (e.g., identify likely paths between trains and one or more defined locations), as well as estimating a probability of movement, of expected travel time and travel time variability. One or more localized maps may be constructed and visualized from regional maps (e.g., a larger regional map as compared to a smaller localized map). Each physical location of control points may be inferred from one or more vehicle stations (e.g., train stations) with known locations. Also, the network connectivity in the railway system may be inferred.

More specifically, a solution of the present invention provides a means by which a digital map may be created using one or more messages of vehicles obtained at one or more control points of a route network. The digital map may be analyzed to estimate a feasibility of simultaneous trajectories of the plurality of vehicles between selected locations in the route network. In one aspect, the vehicles may be one or more various types of trains, subways, automobiles, planes, and the like. For illustrative and descriptive convenience, the various examples provided herein focus on railroad network systems and trains but the examples are not to be construed as limiting.

The mechanisms of the illustrated embodiments leverage a variety of "instrumentation" and/or other sensor, data-collection devices that may be installed in electrical, electromechanical, electromagnetic, signal, or other communication with a particular vehicle (e.g., train) component or component associated with a route of a vehicle, such as a control point within a segment of a vehicle route (e.g., control points within a segment of railroad). The instrumentation may be used to monitor or identify the particular vehicle for a movement and/or change in orientation, position, or other difference as observed from a known origin. The instrumentation and other sensory devices may capture data from the vehicle component or control points which is supplied to a data repository. The vehicle component or control points may record any movement that takes places in the network. As will be further described, the mechanisms of the illustrated embodiments rely on various instrumentation and data recording to achieve intelligence from this data, and provide controlled, meaningful analysis.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. As will be described, functional components of node 10 may even be miniaturized to the extent that they are integrated into wearable components to accomplish various purposes of the illustrated embodiments, such as into headgear, glasses, lenses, contacts, or other wearable components. Cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be integrated into wearable components. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
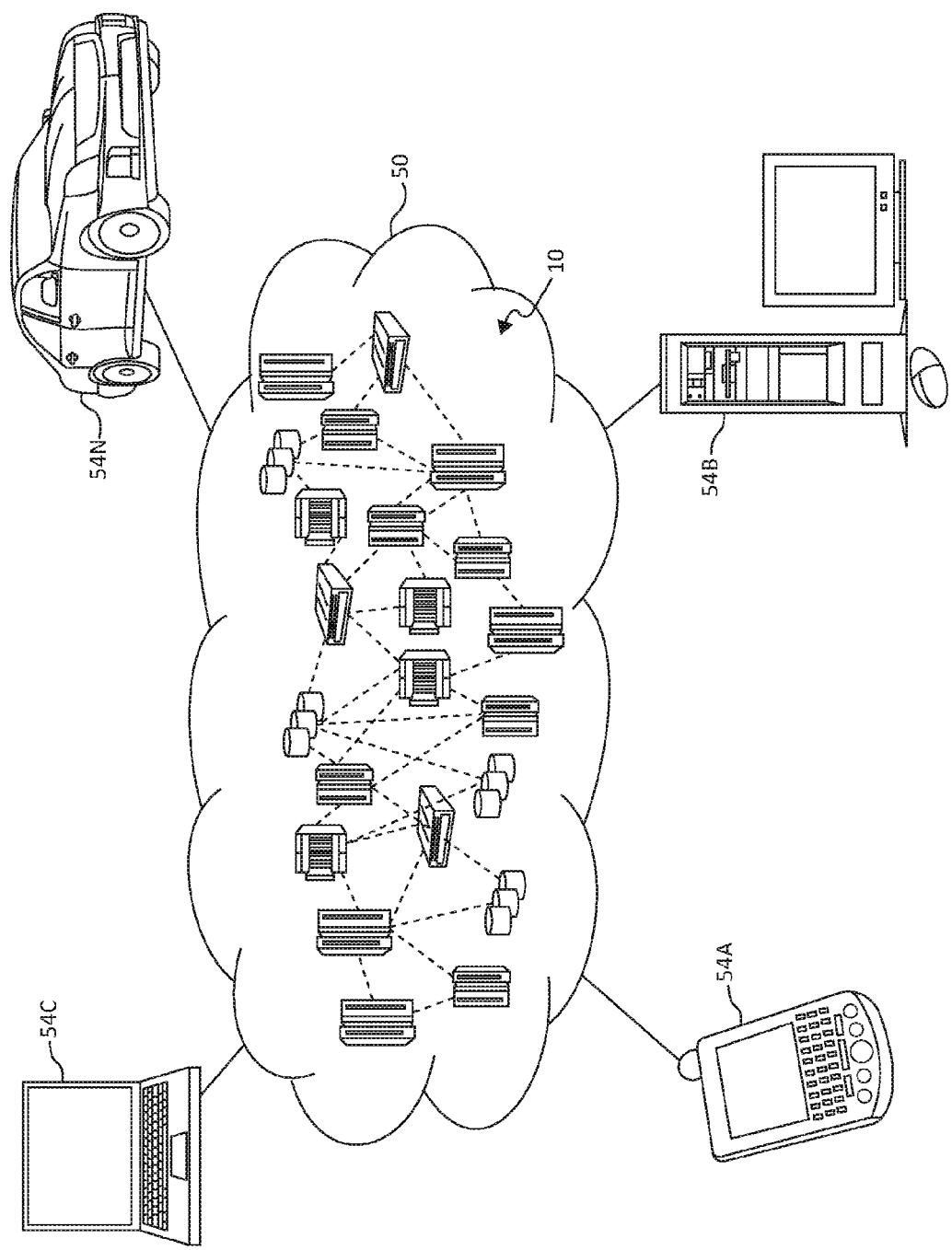
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, smartphone or cellular telephone 54A, desktop computer 54B, laptop computer 54C, and/or in the context of the present invention, vehicle 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
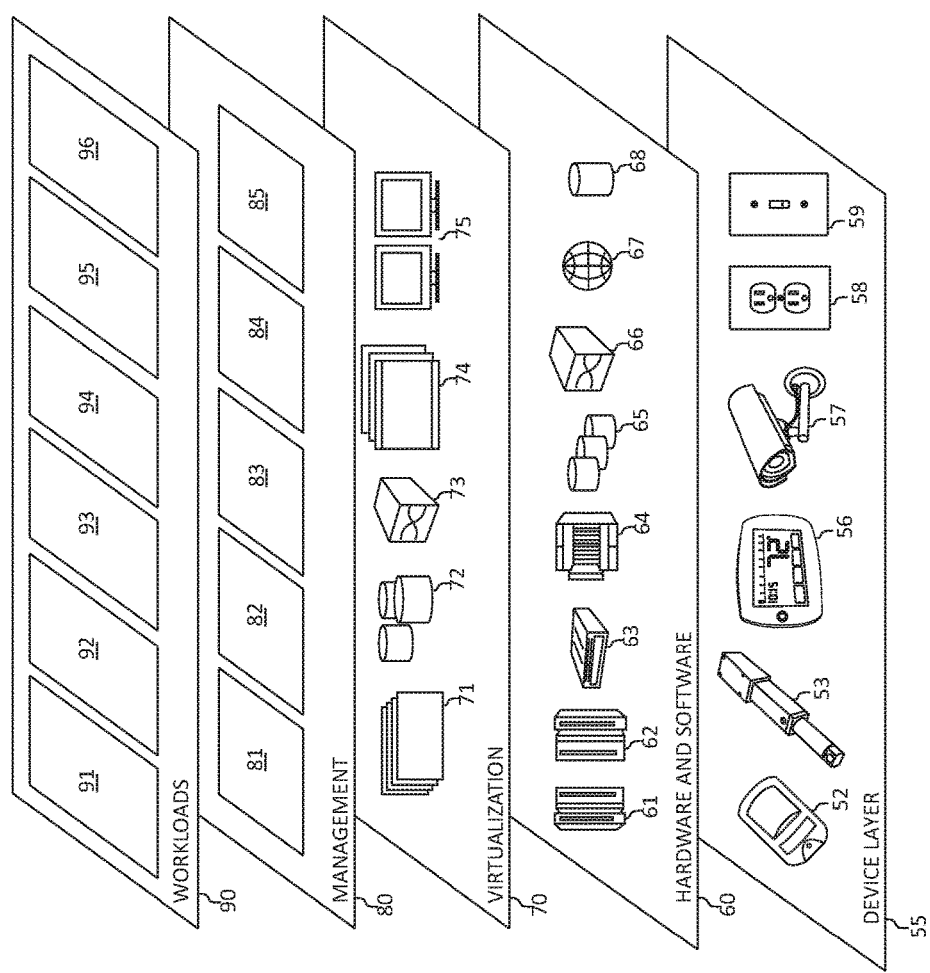
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various vehicle monitoring and network reconstruction from message data workloads and functions 96. In addition, vehicle monitoring and network reconstruction from message data workloads and functions 96 may include such operations as data analysis (including data collection and processing from various environmental sensors), and predictive data analytics functions. One of ordinary skill in the art will appreciate that the vehicle monitoring and network reconstruction from message data workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
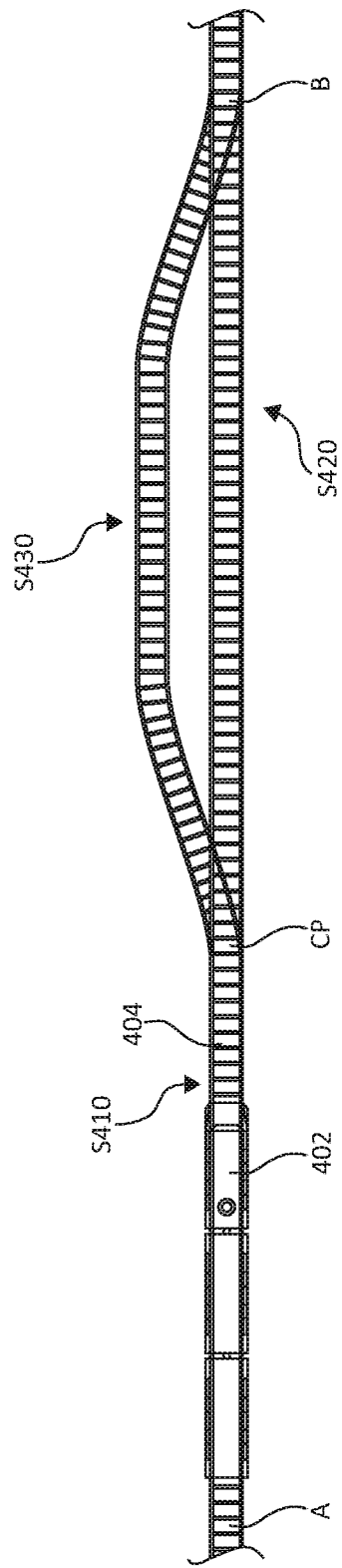
FIG. 4 is a diagram depicting a portion of a vehicle route with control points in accordance with aspects of the present technology.

FIG. 4 depicts a portion of a vehicle route s410 (e.g., a railroad or segment of railroad) with control points ("CP") of vehicle route s410 with a vehicle 402 (e.g., train or other type of vehicle) on track 404. As described herein, the vehicle route s410 may be one continuous series of tracks 404 which may be divided into one or more segments (e.g., s410, s420, and/or s430). In one aspect, a route may be a series of tracks and thus cannot "branch" (contain parallel tracks). So in FIG. 4, the route may only be "s420 or s430" but not "s420 and s430" in parallel. More specifically, the tracks 404 may be "logically" divided for control purposes using one or more CPs that may or may not be related to a physical boundary or division. Each segment s410, s420, s430, may represent the path of one or more segments between CP such as, for example, switches, sidings, stations, etc. that may be common in a railway system. The CP may also detect and record each movement of the vehicle 402 and may receive vehicle message data (e.g., train message data) from each vehicle, such as vehicle 402 (e.g., train). It should be noted that track 404 may be a portion of a complete railway system and/or network map.

It should be noted that track 404 may include one or more control points (although FIG. 4 depicts a single CP for illustrative convenience) and the location of each CP can be estimated using trilateration relative to the locations of nearby stations (not depicted for illustrative convenience). In one aspect, the vehicle message data (e.g., train message data) detected at each CP may include at least a timestamp, the particular control point, such as CP of FIG. 4, and a track stretch, such as segment s410, s420, or s430 and/or platform number. The vehicle message may also contain information on a type of vehicle, such as train 402. In one aspect, a database may be used for storing reconstructed digital maps that may include track 404 and/or a collection of locations of a subset of stations in the network that includes the track 404.

For example, a first segment s410 may extend between point "A" and CP, which may be located at a switch in the railway. The second segment s420 may extend between control point CP and point "B". The third segment s430 may be a parallel track or siding, and may extend between control point CP and point B, but along a different path than segment s420. The CP may be configured to direct the vehicle 402 to either segment s420 or segment s430 depending on a configuration of the CP and/or switch.

As previously mentioned, the mechanisms of the illustrated embodiments provide novel approaches for inferring segments in a vehicle-specific digital map (e.g., rail-specific digital maps) from one or more sequential vehicle messages, such as sequential train messages. Reconstructed digital maps may be used to estimate the likely paths of trains between one or more selected locations and also may be used to estimate the expected travel time and travel time variability. The digital map may be constructed and visualized using localized maps from one or more larger regional maps. Physical locations of control points may be inferred from one or more vehicle stations (e.g., train stations) with known locations. Also, the network connectivity may be inferred and the travel time estimated. In this way, the present invention helps solving the challenge of forecasting arrival and departure times in vehicle networks (e.g., railway networks). That is, the digital maps may be used for identifying the locations of potential bottlenecks of vehicles in the network, interpolating the paths of vehicles (e.g., trains) when provided with limited message data, detecting in real time potential track conflicts among the vehicles, and for estimating typical travel times and travel time variabilities between given points in the network.

As will be further described, the message data may include historical message data composed of a timestamp indicating when the message was generated. The message data may also include a most recently visited vertex and a subcategory associated with each visited vertex. The network may be represented as a collection of vertices and a collection of edges with one or more multiple edges connecting any pair of vertices, which may be inferred from the vertex subcategories. The network may also include a "feasibility matrix" that identifies pairs of edges incoming to, and/or outgoing from, each vertex for which pairs of actions (e.g., movement through the vertex along specific edges) occurring within a defined time window are feasible. Also, the network may include or provide one or more statistics associated with each edge such as, for example, means and variances in travel times, frequency of traversal of outgoing edges, and/or estimates of physical vertex locations. In one aspect, a vertex may represent a control point and a network edge may represent a portion, stretch, or piece of a vehicle track (e.g., railway track) between two control points.

Network Reconstruction

Figure 5:
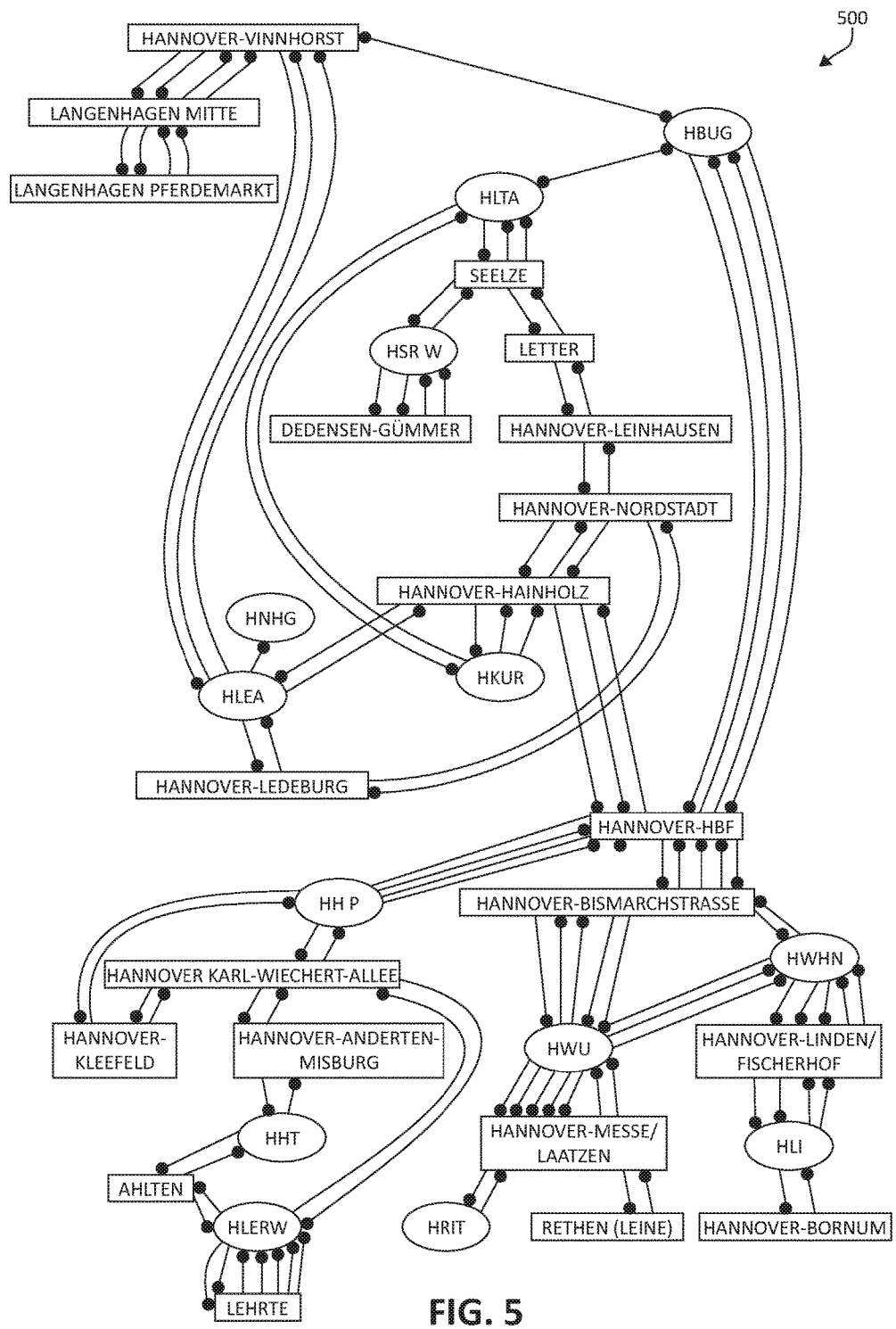
FIG. 5 is a diagram depicting network reconstruction and visualization and with vehicle messages in accordance with aspects of the present technology.

Turning now to FIG. 5, FIG. 5 depicts a diagram of a network map 500 with network reconstruction and visualization, which may include one or more vehicle messages (e.g., train messages). In one aspect, one or more of the components, modules, services, applications, and/or functions described in FIGS. 1-4 may be used in FIG. 5. For example, computer system/server 12 of FIG. 1, incorporating processing unit 16, may be used to perform various computational, signaling, and/or data processing and other functionality in accordance with various aspects of the present invention.

In one aspect, the network digital map 500 includes one or more vehicle stations (e.g., train stations), which are illustrated in FIG. 5 as square boxes with the name of the station therein, such as for example, Hannover Hbf, Hannover Hainholz, Hannover-Vinnhorst and the like. Vehicle tracks (e.g., train tracks) are depicted as a single line with the "dot" located on the train station indicating the direction. For example, the train station "Langenhagen Pferdemarkt" has two north bound tracks to Langenhagen Mitte and two south bound tracks from Langenhagen Mitte. The number of vehicle stations depicted in FIG. 5 are shown for illustrative purposes and to depict, by way of example, an underlying physical geographical location of the vehicle stations. As such, as one or more trains pass by and/or through a control point (depicted with circular boxes with the code of the control point labeled therein such as, for example, "HBUG"), the control point may capture a vehicle message (e.g., train message). Using one or more vehicle messages, one or more translations operations (which may use a map and/or a knowledge domain of an ontology of the map and/or vehicle network) may be performed to detect one or more control points. Thus, the control points (identified from the translated message data) are depicted in FIG. 5 as circles with the name of the control point located therein. For example, the control point "HBUG" is identified between the train station Hannover Hbf and the train station Hannover-Vinnhorst. Also, the control point "HBUG" is connected to the control point "HLTA" and train station Hannover Hbf.

More specifically, in one aspect, a network reconstruction component may be used to produce a network digital map 500 representation of a network (e.g., a vehicle route network such as a railroad, subway system, highway system, and the like) from a collection of vehicle messages that may be generated when each vehicle (e.g., train) passes given points in the vehicle network (e.g., railway system). To construct the network digital map 500, a collection of the vehicles' messages may be sorted by date, vehicle identification (ID) (e.g., a train ID), and/or time. Pairs of consecutive control points and track stretches may be recorded from the message sequence. An example of the pairs of consecutive control paints in FIG. 5 may be the pair HTLA-HBUG and may be traversed consecutively on the way from Seelze to Hannover Hbf. Each pair of consecutive control points, together with traversed stretches of track may be recorded as a network edge if the number of consecutive control points observed are greater than a predetermined number of observation times. A frequency of transitions from each outgoing network edge may be recorded at each vertex for computing potential routes. Also, a mean and standard deviation of travel times may be recorded for each edge. It should be noted that the dark "dots" indicate a direction of travel to the control point or vehicle station.

Control Point Localization

Figure 6:
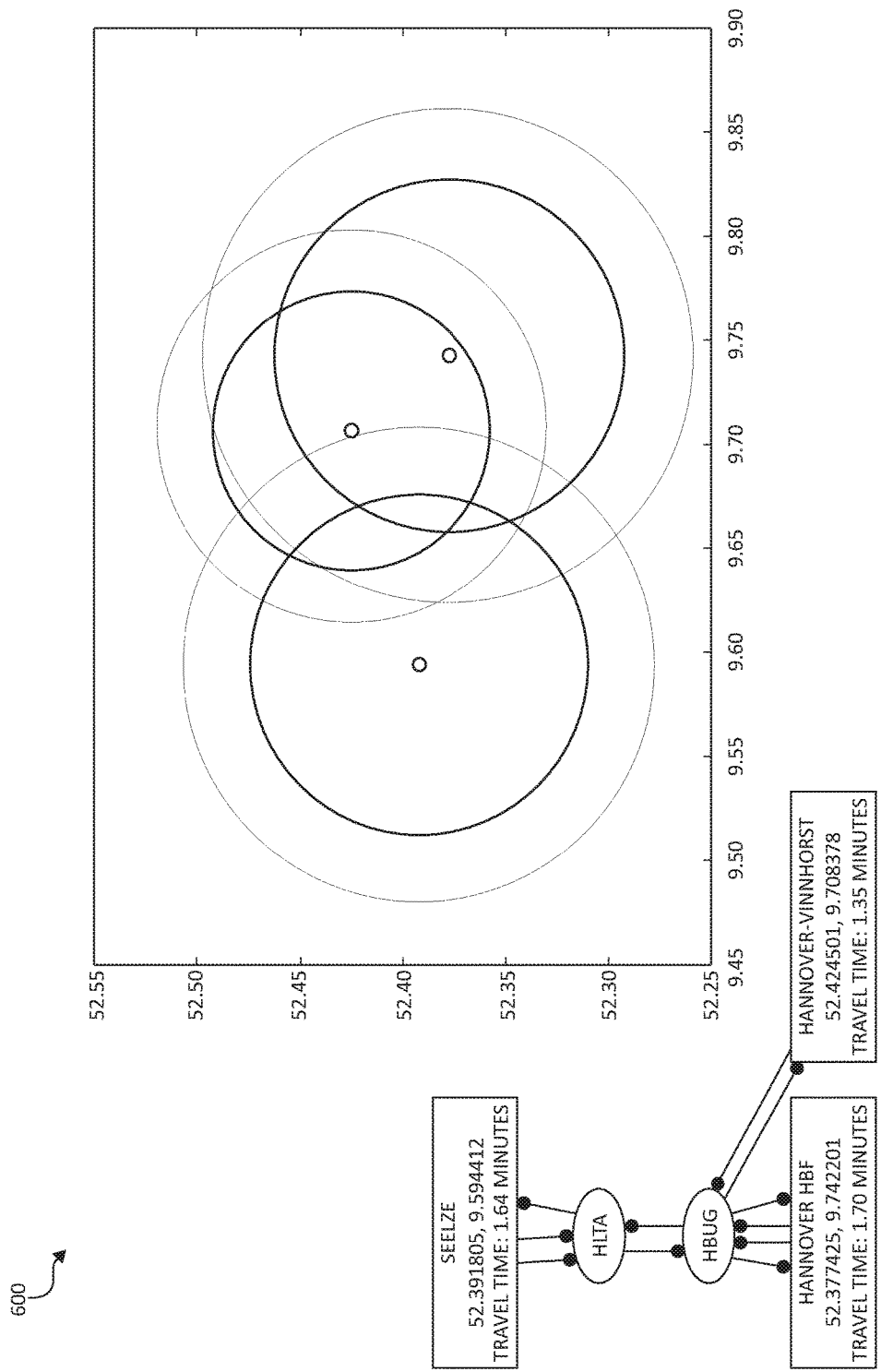
FIG. 6 is a diagram depicting control point localization in accordance with aspects of the present technology.

Turning now to FIG. 6, a diagram of control point localization 600 is depicted. By way of example only, the x-axis depicts the longitude and the y-axis illustrates the latitude for control point localization. As depicted in FIG. 6, one or more control points are listed herein, by way of example only, as the following acronyms. For example, HLTA means and/or identifies the control point location of "Hannover Letter Abzweig" and HBUG means and/or identifies the control point location of "Hannover Burg". The triangulation (using the latitude and longitude graph) in the right panel or side of FIG. 6 indicates how a location of the control point, such as for "HBUG" is estimated from the location of three stations "Seelze", "Hannover Hbf" and "Hannover-Vinnhorst" using the known geo-coordinates of the three stations (e.g., Seelze, Hannover Hbf, and/or Hannover-Vinnhorst) as well as the travel times from each of the three stations to the control point "HBUG" (e.g., the code of the control point is "HBUG").

A selected and/or identified geographic location of one or more vehicle stations in the network (which may be identified or tagged as necessary, important, and/or critical in the network map) may be available and known but the information on the geographic locations of other network features (e.g., track switches, control points, etc.) may be unknown. Thus, the locations of control points can be estimated using trilateration relative to the geographic locations of one or more nearby stations with known geographic locations. To estimate the location of a control point, one or more stations within a selected distance with known locations may be discovered by locally searching the reconstructed network. This may be achieved by first searching (a best-first search) and sorting travel times. The searching may be concluded or terminated when a station with known locations has been reached in all search directions (e.g., by following all outgoing stretches from a given control point to search all directions). In one aspect, searching identifies the closest travel times for traveling to a control point. The best-first search may refer to a standard graph search algorithm operation in order to identify the closest vehicle stations according to travel times. That is, a best-first search is referring to a standard graph search algorithm in order to find one or more closest stations.

For example, the vehicle stations are depicted on the x-axis and the y-axis. Station "Seelze" has the latitude of 52.391805 and the longitude of 9.594412 with a travel time to and/or from control point HLTA of 1.64 minutes. Station "Hannover Hbf" has the latitude of 52.377425 and the longitude of 9.742201 with a travel time to and/or from control point HBUG of 1.70 minutes. Station "Hannover-Vinnhorst" has the latitude of 52.424501 and the longitude of 9.708378 with a travel time to and/or from control point HBUG of 1.35 minutes.

The average travel time to each discovered station relating to each vehicle may be computed. The average travel time may be treated as proportional to the distance for each vehicle, assuming a uniform average speed. It should be noted that "neighbors" of a given control point are the neighboring control points or stations closest to it in each search direction. For estimating the locations of control points using trilateration relative to the geographic locations of one or more nearby stations with known geographic location trilateration, distance information is needed. However, since only time stamp information is provided in the vehicle message, the distance may be estimated by calculating the difference of the time stamps (which may equal the elapsed travel time from a control point to its neighbor). The calculated difference may then be multiplied by an average speed.

A feasible region of potential control point locations may be identified for a selected speed, for example, according to the average travel times and uniform average speed. To select a single estimated location, an optimization challenge may be used to compute a unique location that is feasible for all feasible average speeds.

Figure 7:
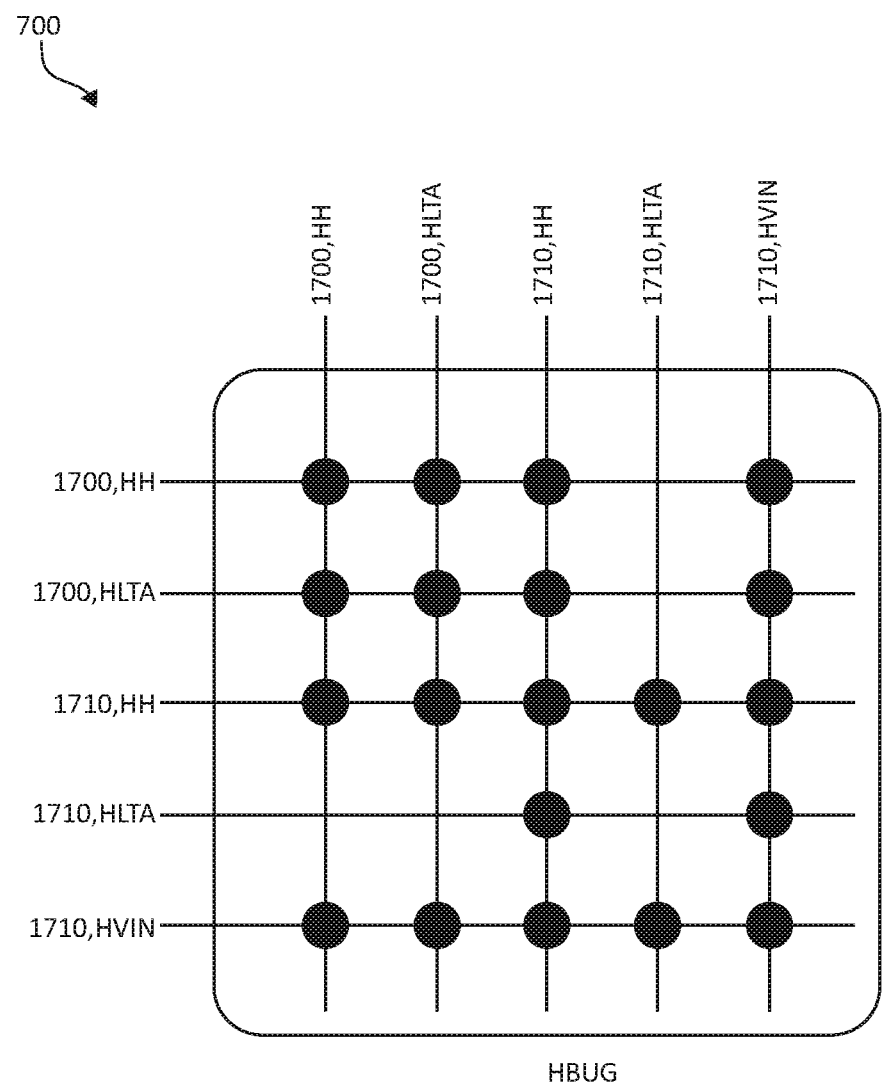
FIG. 7 is a diagram depicting a matrix for representing feasibility of movements in accordance with aspects of the present technology.

Feasibility Matrix Construction:

Turning now to FIG. 7, a diagram depicting a matrix 700 for identifying feasible movements is depicted. That is, FIG. 7 depicts a feasibility matrix construction 700. In one aspect, one or more simultaneous movements by multiple vehicles may not be possible at each station and control point. Thus, a collection of simultaneously feasible movements by pairs of vehicles may be estimated by analyzing message data. Specifically, message data can be analyzed to identify movements that have occurred within a predefined time window (e.g., short time window less than a time threshold) by at least two vehicles (e.g., trains). In one aspect, the predefined time window, for example, may be between 30 and 60 seconds. Thus, if two movements between vehicles have been recorded within 60 seconds, the movements can be considered as simultaneous. (It should be noted that the predefined time window thresholds may be calibrated according to user preference, route/track design, and the like, as the predefined time window thresholds may depend on the track layout and train control technology installed in a control point, the speed of the trains, or other factors that may affect movement of the vehicles.) For each station and/or control point in the network, a matrix representing the collection of pairwise feasible movements may be computed. The matrix may be used for identifying potential conflicts between vehicles (e.g., the trains) when arrival times deviate from the scheduled timetable.

In one aspect, the codes of the control points "HH" means and/or identifies the control point location of "Hannover Hbf", "HLTA" means and/or identifies the control point location of "Hannover Letter Abzweig", "HVIN" means and/or identifies the control point location of "Hannover-Vinnhorst", "HBUG" means and/or identifies the control point location of "Hannover Burg". The numbers 1700 and 1710 are the track (route) stretch identifiers. The matrix of FIG. 7 indicates which pairs of movements are simultaneously possible and allowed, as indicated and marked with a dot. For example, a movement on stretch 1710 to and/or from HLTA would be possible together with a movement on stretch 1710 to and/or from HH (as indicated with a dot in the matrix for those intersecting stretches). Alternatively, movement on stretch 1710 to and/or from HLTA is not simultaneously possible and/or not allowed with a movement on stretch 1700 to and/or from HH (as indicated without a dot in the matrix for those intersecting stretches).

Thus, the present invention provides for reconstructing rail maps from train message data. The embodiments of the present invention may include inferring potential paths of trains between two given locations and constructing and visualizing local maps. The locations of control points may be estimated. In one aspect, the systems of the present invention may include logic for sorting, formatting, and storing map segments and computing one or more potential paths through networks, computing local neighborhoods within networks, and estimating locations of control points. As an additional aspect, the present invention may use and rely on a collection of train messages, each containing at least a timestamp, a control point, and a track stretch and/or platform number. In an additional aspect, messages may also contain information on train type. A database may be included for storing reconstructed digital maps. In this way, the present invention provides one or more benefits that enable the ability to automatically generate digital rail network maps without knowledge of the track infrastructure or manual effort. Maps may be refreshed using recent data, automatically capturing recent changes in the network. The digital maps may be annotated with estimates of travel times and travel time variability from recent operations data. The digital maps may be annotated with the frequency of various movements from recent schedules, allowing for the estimation of paths between given locations.

Figure 8:
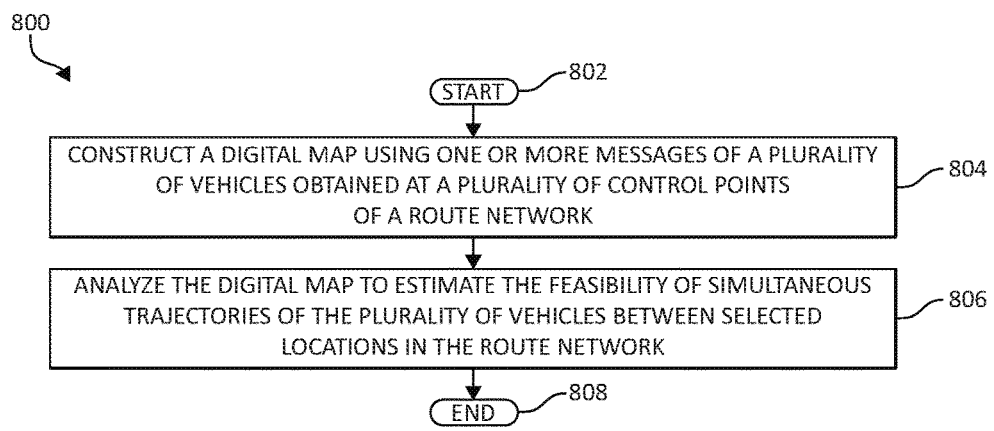
FIG. 8 is an additional flowchart diagram depicting an additional exemplary method for network reconstruction from message data, again in which various aspects of the present invention may be implemented.

FIG. 8 is a flowchart diagram depicting an exemplary method for network reconstruction from message data by a processor, in which aspects of the present invention may be realized. The functionality 800 may be implemented as a method executed as instructions on a machine, where the instructions are included on at least one computer readable medium or one non-transitory machine-readable storage medium. The functionality 800 may start in block 802. A digital map may be created using one or more messages of a plurality of vehicles (e.g., a train) obtained at a plurality of control points of a route network (e.g., a railway system), as in block 804. The digital map may be analyzed to estimate a feasibility of simultaneous trajectories of the plurality of vehicles between selected locations in the route network, as in block 806. The functionality 800 may end, as in block 808.

In one aspect, in conjunction with and/or as part of at least one block of FIG. 8, the operation of 800 may include each of the following. The operation of 800 may include estimating a plurality of paths of each of the plurality of vehicles between the selected locations in the route network, estimating an expected travel time of each of the plurality of vehicles between the selected locations in the route network using data obtained from the multiple control points (which may receive, collect, store, transmit, and/or maintain vehicle messages), collecting the one or more messages at one or more pairs of the plurality of control points as one or more of the plurality of vehicles pass by the one or more pairs of the plurality of control points during a course of travel on the route network, and/or recording, as a network edge of the route network, pairs consecutive control points of the plurality of control points together with traversed segments of the plurality of vehicles.

The operation of 800 may include inferring physical locations of the plurality of control points according to detected stations in the route network, one or more known anchor control points of the detected stations, and estimated travel time between the one or more anchor control points, and/or identifying potential navigational conflicts between the plurality of vehicles upon arrival times to one of the selected locations deviating from a scheduled timetable. In one aspect, an anchor control point may refer to a control point with known location information (such that it can be used as an anchor in the inference of other control points' locations).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for network reconstruction from message data, comprising:
constructing a digital map using one or more messages of a plurality of vehicles obtained at a plurality of control points of a route network;
analyzing the digital map to estimate a feasibility of simultaneous trajectories of the plurality of vehicles between selected locations in the route network; and
inferring physical locations of the plurality of control points according to detected stations in the route network, one or more known anchor control points of the detected stations, and estimated travel time between the one or more anchor control points; wherein the digital map is automatically constructed and updated in real-time using the one or more messages by the processor without prior knowledge of the route network and with no manual input from a user.

2. The method of claim 1, further including estimating a plurality of paths of each of the plurality of vehicles between the selected locations in the route network.

3. The method of claim 1, further including estimating an expected travel time of each of the plurality of vehicles between the selected locations in the route network using data obtained from the multiple control points.

4. The method of claim 1, further including collecting the one or more messages at one or more pairs of the plurality of control points as one or more of the plurality of vehicles pass by the one or more pairs of the plurality of control points during a course of travel on the route network.

5. The method of claim 1, further including recording, as a network edge of the route network, pairs consecutive control points of the plurality of control points together with traversed segments of the plurality of vehicles.

6. The method of claim 1, further including identifying potential navigational conflicts between the plurality of vehicles upon arrival times to one of the selected locations deviating from a scheduled timetable.

7. A system for network reconstruction from message data, comprising:
one or more computers with executable instructions that when executed cause the system to:
construct a digital map using one or more messages of a plurality of vehicles obtained at a plurality of control points of a route network;
analyze the digital map to estimate a feasibility of simultaneous trajectories of the plurality of vehicles between selected locations in the route network; and
identify physical locations of the plurality of control points according to detected stations in the route network, one or more known locations of the detected stations, and estimated travel time between the one or more known locations; wherein the digital map is automatically constructed and updated in real-time using the one or more messages by the one or more computers without prior knowledge of the route network and with no manual input from a user.

8. The system of claim 7, wherein the executable instructions estimate a plurality of paths of each of the plurality of vehicles between the selected locations in the route network.

9. The system of claim 7, wherein the executable instructions estimate an expected travel time of each of the plurality of vehicles between the selected locations in the route network using data obtained from the multiple control points.

10. The system of claim 7, wherein the executable instructions collect the one or more messages at one or more pairs of the plurality of control points as one or more of the plurality of vehicles pass by the one or more pairs of the plurality of control points during a course of travel on the route network.

11. The system of claim 7, wherein the executable instructions identify potential navigational conflicts between the plurality of vehicles upon arrival times to one of the selected locations deviating from a scheduled timetable.

12. A computer program product for network reconstruction from message data by a processor, the computer program product comprising a non-transitory computer-readable storage medium having computer-readable program code portions stored therein, the computer-readable program code portions comprising:
an executable portion that constructs a digital map using one or more messages of a plurality of vehicles obtained at a plurality of control points of a route network;
an executable portion that analyzes the digital map to estimate a feasibility of simultaneous trajectories of the plurality of vehicles between selected locations in the route network; and
an executable portion that identifies physical locations of the plurality of control points according to detected stations in the route network, one or more known locations of the detected stations, and estimated travel time between the one or more known locations; wherein the digital map is automatically constructed and updated in real-time using the one or more messages by the processor without prior knowledge of the route network and with no manual input from a user.

13. The computer program product of claim 12, further including an executable portion that estimates a plurality of paths of each of the plurality of vehicles between the selected locations in the route network.

14. The computer program product of claim 12, further including an executable portion that estimates an expected travel time of each of the plurality of vehicles between the selected locations in the route network using data obtained from the multiple control points.

15. The computer program product of claim 12, further including an executable portion that collects the one or more messages at one or more pairs of the plurality of control points as one or more of the plurality of vehicles pass by the one or more pairs of the plurality of control points during a course of travel on the route network.

16. The computer program product of claim 12, further including an executable portion that identifies potential navigational conflicts between the plurality of vehicles upon arrival times to one of the selected locations deviating from a scheduled timetable.

* * * * *